United States Patent
Lin et al.

(10) Patent No.: US 12,420,662 B2
(45) Date of Patent: Sep. 23, 2025

(54) METHOD OF HYBRID BATTERY ELECTRICAL ENERGY OUTPUT DISTRIBUTION CONTROL FOR ELECTRIC VEHICLE

(71) Applicant: NATIONAL CHUNG SHAN INSTITUTE OF SCIENCE AND TECHNOLOGY, Taoyuan (TW)

(72) Inventors: Dao-Qin Lin, Taoyuan (TW); Chi-Sheng Wu, Taoyuan (TW); Shih-Chang Tseng, Taoyuan (TW); Chih-Hsien Chung, Taoyuan (TW); Gwo-Huei You, Taoyuan (TW); Kuo-Kuang Jen, Taoyuan (TW)

(73) Assignee: NATIONAL CHUNG SHAN INSTITUTE OF SCIENCE AND TECHNOLOGY, Taoyuan (TW)

( * ) Notice: Subject to any disclaimer, the term of this patent is extended or adjusted under 35 U.S.C. 154(b) by 420 days.

(21) Appl. No.: 18/090,518

(22) Filed: Dec. 29, 2022

(65) Prior Publication Data

US 2024/0217386 A1 Jul. 4, 2024

(51) Int. Cl.
*B60L 58/12* (2019.01)
*B60L 58/16* (2019.01)
*G05B 15/02* (2006.01)
*H01M 10/48* (2006.01)
*H01M 10/42* (2006.01)

(52) U.S. Cl.
CPC ............ *B60L 58/12* (2019.02); *B60L 58/16* (2019.02); *G05B 15/02* (2013.01); *H01M 10/48* (2013.01); *H01M 2010/4278* (2013.01); *H01M 2220/20* (2013.01)

(58) Field of Classification Search
None
See application file for complete search history.

(56) References Cited

U.S. PATENT DOCUMENTS

| | | | | |
|---|---|---|---|---|
| 10,907,981 | B2 * | 2/2021 | Li | G01C 21/3697 |
| 2014/0186659 | A1 * | 7/2014 | Dhar | B60L 50/62 |
| | | | | 429/9 |
| 2015/0188207 | A1 * | 7/2015 | Son | H01M 50/271 |
| | | | | 429/224 |
| 2016/0200214 | A1 * | 7/2016 | Ishibashi | B60L 58/20 |
| | | | | 180/65.1 |
| 2019/0190282 | A1 * | 6/2019 | Zheng | H01M 10/48 |

(Continued)

*Primary Examiner* — Bernard G Lindsay (57) ABSTRACT

A method of hybrid battery electrical energy output distribution control for an electric vehicle. The method has steps comprising: (A) providing battery data of a high energy density battery and a high power density battery; (B) setting a boundary condition comprising (a) the highest and lowest boundary values of the state of health (SOH) of the batteries, (b) the highest and lowest boundary values of the state of charge (SOC) of the batteries, (c) the highest and lowest boundary values of the charge and discharge rate (C-rate) of the high energy density battery; (C) setting an energy consumption objective function; (D) using a global search algorithm to search and calculate the minimum equivalent energy consumption value under various driving conditions to establish a minimum equivalent energy consumption multi-dimensional table to achieve the output of minimum energy consumption under different driving conditions.

5 Claims, 4 Drawing Sheets (56) References Cited

U.S. PATENT DOCUMENTS

| | | | |
|---|---|---|---|
| 2019/0225092 A1* | 7/2019 | Li | B60L 58/18 |
| 2020/0075959 A1* | 3/2020 | Anandan | H01M 10/0525 |
| 2021/0126235 A1* | 4/2021 | Perng | H01M 4/621 |
| 2023/0303052 A1* | 9/2023 | Gesang | B60W 20/12 |

* cited by examiner

METHOD OF HYBRID BATTERY ELECTRICAL ENERGY OUTPUT DISTRIBUTION CONTROL FOR ELECTRIC VEHICLE

BACKGROUND OF THE INVENTION

1. Field of the Invention

The present disclosure relates to a method of battery electrical energy output, and in particular to a method of hybrid battery electrical energy output distribution control for an electric vehicle.

2. Description of the Related Art

Early electric vehicles used lead storage batteries, however, because of insufficient endurance in battery performance and other problems, the lead-acid batteries were not popularized, and then fuel oil engine vehicles rose rapidly and electric vehicles disappeared from the market. In recent years in response to climate change and increasingly serious environmental pollution, the current technological development of vehicles goes toward technologies of low emissions, energy saving, and so on, so that vehicle electric power technology has gradually converted from the early use of lead storage batteries to the use of high energy density lithium batteries.

The electric vehicle industry has developed so far, the current main sources of electric power are single high energy density lithium batteries for development. Although lithium batteries have many advantages and are widely used, they also have low high current resistance, low power density, slow charging speed, and low battery cycles and other disadvantages that cannot be ignored. The above numerous shortcomings have also become a major problem in the current electric vehicle industry, such as when electric vehicles brake, it causes electrical energy recovery to accelerate the aging of lithium batteries because of excessive current, even lead to battery failure because of the internal resistance rising too fast. For example, because of low power density, the battery cannot often meet the required energy demand, and leads to an increase in battery energy consumption and accelerate the speed of battery exhaustion. Therefore the industry uses a complete set of battery management system (BMS), in order to be able to feedback and control the real-time state of the battery pack to ensure the safety and reliability of the power battery pack. The state of charge (SOC) of the battery is the most important parameter in BMS, and it is also the most important part of the battery state detection function. However, because the inside of the chemical battery is complex and uncontrollable, the amount of internal measurable parameters is very limited, and the characteristics are coupled with each other, the chemical battery is used and decays, having strong time-varying and highly nonlinear characteristics and other factors that are difficult to estimate. It can only be estimated according to the model combined with the corresponding algorithm. State of health (SOH) of the battery is also a crucial parameter in BMS, because the rapid charging and discharging capacity and storage capacity of the power battery will decline with the continuous aging of the battery. The aging condition of the battery can be measured in the case of long-term charging and discharging by estimating the SOH value in real time.

BRIEF SUMMARY OF THE INVENTION

As mentioned above, the current batteries of electric vehicles are typically a single type of battery, even if the battery condition is mastered through the battery management system (BMS), the road conditions of driving are changeable, such as climbing and other conditions that need to output large current instantaneously, the battery module is prone to overheating, shortening battery life and other unavoidable damage will occur. Therefore the industry urgently needs to develop a lithium battery using two different characteristics, in order to build a hybrid battery system that can use a good method of hybrid battery electrical energy output distribution control.

In order to improve the shortcomings of the prior art, the present disclosure provides a method of hybrid battery electrical energy output distribution control for an electric vehicle, integrating a high energy density battery, a high power density battery, a boundary condition, a global search algorithm, etc., to achieve the output of minimum energy consumption under different driving conditions. Accordingly, the overall battery system efficiency can be improved, and the battery aging rate can be reduced, so that the cost and efficiency can be taken into account at the same time, and the optimal electrical energy output distribution of the hybrid battery system can be obtained with the minimum equivalent energy consumption, so that the electric vehicle can achieve the optimal battery usage cost for driving.

The present disclosure comprises a method of hybrid battery electrical energy output distribution control for an electric vehicle. The electric vehicle uses the method of hybrid battery electrical energy output distribution that is completely set up to control the operation of an electric motor by a computer system. The method has steps comprising: (A) providing battery data of a high energy density battery and a high power density battery; (B) setting a boundary condition, the boundary condition comprises (a) the highest and lowest boundary values of the state of health (SOH) of the high energy density battery and the high power density battery, (b) the highest and lowest boundary values of the state of charge (SOC) of the high energy density battery and the high power density battery, (c) the highest and lowest boundary values of the charge and discharge rate (C-rate) of the high energy density battery; (C) setting an energy consumption objective function, the energy consumption objective function is:

$$J = F_{(high\ energy\ SOH)} \times F_{(high\ energy\ SOC)} \times$$
$$F_{(high\ energy\ c\_rate)} \times (P_{high\ energy}/\eta_{high\ energy}) +$$
$$F_{(high\ energy\ SOH)} \times F_{(high\ energy\ SOC)} \times (P_{high\ power}/\eta_{high\ power})$$

wherein, J is the energy consumption objective function, F is a weight factor function, P is the battery output power, n is battery discharge efficiency; (D) using a global research algorithm to carry out a nested loop search, and calculating and obtaining the minimum equivalent energy consumption value under various driving conditions by the energy consumption objective function to establish a minimum equivalent energy consumption multi-dimensional table; (E) storing the minimum equivalent energy consumption multi-dimensional table in the computer system, the computer system uses the minimum equivalent energy consumption multi-dimensional table to control the operation of the electric motor, wherein the computer system searches the minimum equivalent energy consumption multi-dimensional table by direct search or interpolated search to obtain the optimal electrical energy output distribution.

The boundary condition in the step (B) is:

$$SOH_{high\ energy,min} \leq SOH_{high\ energy} \leq SOH_{high\ energy,max}$$

$$SOH_{high\ power,min} \leq SOH_{high\ power} \leq SOH_{high\ power,max}$$

$$SOC_{high\ energy,min} \leq SOC_{high\ energy} \leq SOC_{high\ energy,max}$$

$$SOC_{high\ power,min} \leq SOC_{high\ power} \leq SOC_{high\ power,max}$$

$$C_{\_rate\ high\ energy,min} \leq C_{\_rate\ high\ energy,min} \leq C_{\_rate\ high\ energy,max}$$

wherein, $SOH_{high\ energy,min}$: represents the lowest boundary value of the state of health of the high energy density battery, $SOH_{high\ energy}$: represents the real-time state of health of the high energy density battery, $SOH_{high\ energy,max}$: represents the highest boundary value of the state of health of the high energy density battery, $SOH_{high\ power,min}$: represents the lowest boundary value of the state of health of the high power density battery, $SOH_{high\ power}$: represents the real-time state of health of the high power density battery, $SOH_{high\ power,max}$: represents the highest boundary value of the state of health of the high power density battery, $SOC_{high\ energy,min}$: represents the lowest boundary value of the state of charge of the high energy density battery, $SOC_{high\ energy}$: represents the real-time state of charge of the high energy density battery, $SOC_{high\ energy,max}$: represents the highest boundary value of the state of charge of the high energy density battery, $SOC_{high\ power,min}$: represents the lowest boundary value of the state of charge of the high power density battery, $SOC_{high\ power}$: represents the real-time state of charge of the high power density battery, $SOC_{high\ power,max}$: represents the highest boundary value of the state of charge of the high power density battery, $C_{\_rate\ high\ energy,min}$: represents the lowest boundary value of the charge and discharge rate of the high energy density battery, C_rate high energy: represents the real-time charge and discharge rate of the high energy density battery, and $C_{\_rate\ high\ energy,max}$: represents the highest boundary value of the charge and discharge rate of the high energy density battery.

In an embodiment of the present disclosure, the high energy density battery is a ternary lithium battery (but not limited to thereto), and the high power density battery is a lithium-titanate battery (but not limited to thereto), both the ternary lithium battery and the lithium-titanate battery are electrically connected to the electric motor; the boundary condition of the present embodiment is (1) the state of health (SOH) values of the high energy density battery (e.g., ternary lithium battery) and the high power density battery (e.g., lithium-titanate battery) at the working state must be between the highest and lowest boundary values of the state of health (SOH) of the high energy density battery and the high power density battery, (2) the state of charge (SOC) values of the high energy density battery (e.g., ternary lithium battery) and the high power density battery (e.g., lithium-titanate battery) at the working state must be between the highest and lowest boundary values of the state of charge (SOC) of the high energy density battery and the high power density battery, (3) the charge and discharge rate (C-rate) value of the high energy density battery (e.g., ternary lithium battery) at the working state must be between the highest and lowest boundary values of the charge-discharge rate (C-rate) of the high energy density battery. In the present embodiment, if the working state of the high energy density battery (ternary lithium battery) or the high power density battery (lithium-titanate battery) is not within the boundary condition, the battery is not used for electrical output.

The above summary and the following detailed description and accompanying drawings are intended to further illustrate the manner, means, and effect of the present disclosure for achieving a predetermined object. Other objects and advantages of the present disclosure will be described in subsequent descriptions and drawings.

DETAILED DESCRIPTION OF THE INVENTION

The implementation of the present disclosure is described by the specific embodiments as below, those skilled in the art can easily understand the advantage and effect by the content disclosed by the present specification.

Figure 1:
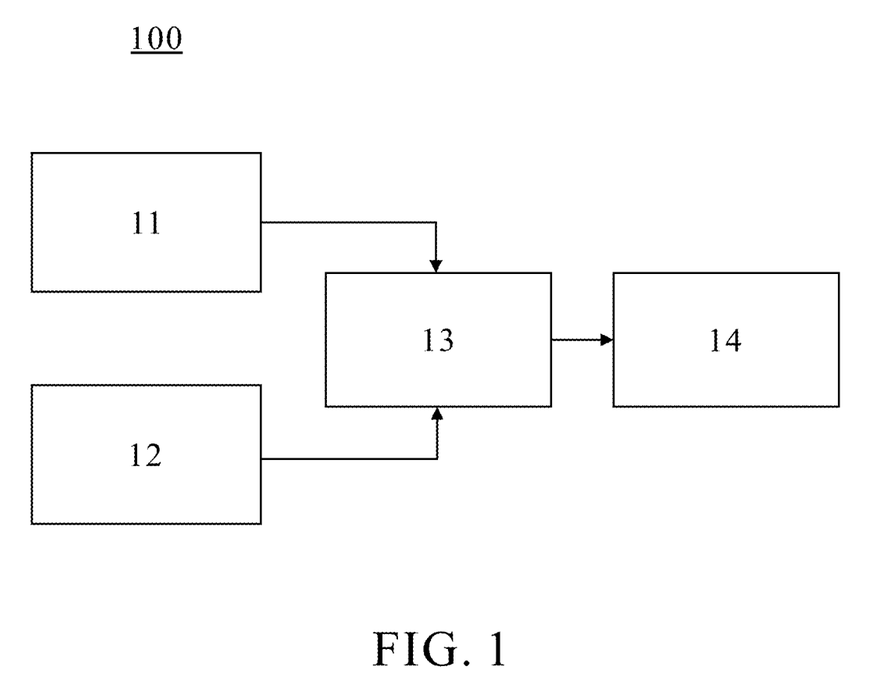
FIG. 1 is a schematic view of an architecture of a hybrid battery electrical energy output distribution control system for an electric vehicle of an embodiment of the present disclosure.

Refer to FIG. 1, which is a schematic view of an architecture of a hybrid battery electrical energy output distribution control system for an electric vehicle of the present disclosure. As shown in FIG. 1, the architecture of the hybrid battery electrical energy output distribution control system 100 for an electric vehicle comprises an energy unit composed of a high energy density battery 11 and a high power density battery 12, a power unit of an electric motor 13, and a transmission mechanism 14, wherein the electric vehicle may be an electric bus (not limited to thereto). In the present embodiment, in the architecture of the hybrid battery electrical energy output distribution control system 100, the high energy density battery 11, and the high power density battery 12 supply the generated battery output electrical energy to the electric motor 13, the electric motor 13 outputs energy to the transmission mechanism 14 to generate kinetic energy from the electric vehicle.

Figure 2:
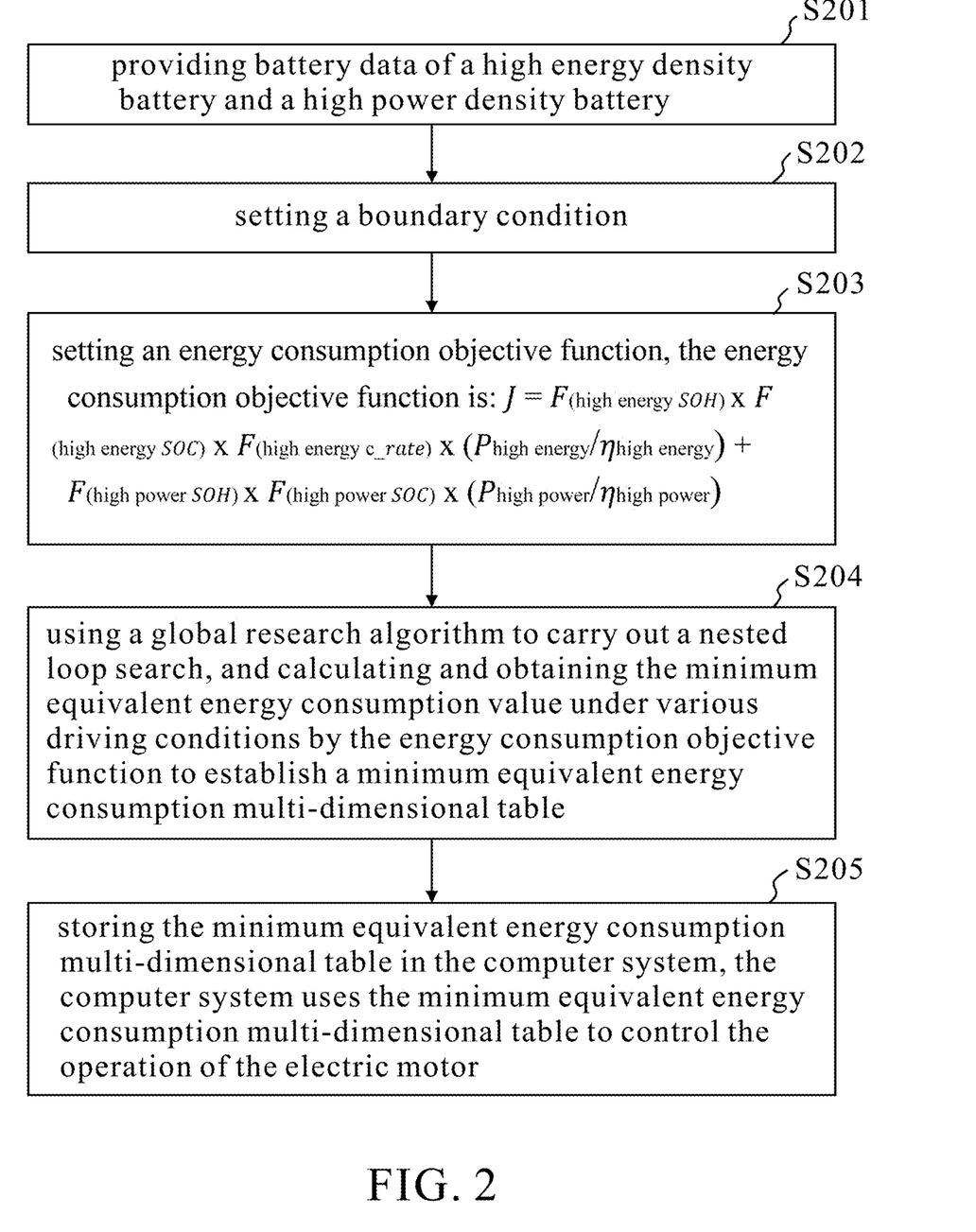
FIG. 2 is a schematic flow chart of a method of a hybrid battery electrical energy output distribution control for an electric vehicle of an embodiment of the present disclosure.

Refer to FIG. 2, which is a schematic flow chart of a method of a hybrid battery electrical energy output distribution control for an electric vehicle of the present disclosure. As shown in FIG. 2, the method of the hybrid battery electrical energy output distribution control for an electric vehicle is used for an electric vehicle, the electric vehicle uses a method of hybrid battery electrical energy output distribution that is completely set up to control the operation of an electric motor by a computer system, has steps comprising: first, step S201, providing battery data of a high energy density battery 11 and a high power density battery 12, wherein the battery data comprises battery output power, battery state of health (SOH), battery state of charge (SOC), battery charge and discharge rate (C-rate), and other data. The battery data is stored in a storage unit, the storage unit may be designed within the computer system, but not limited to thereto; in an embodiment of the present embodiment, the high energy density battery 11 is a ternary lithium battery, the ternary lithium battery is electrically connected to the electric motor 13, and the high power density battery 12 is a lithium-titanate battery, the lithium-titanate battery is electrically connected to the electric motor 13.

Next, in step S202, setting a boundary condition (S202), the boundary condition comprises (a) the highest and lowest boundary values of the state of health (SOH) of the high energy density battery 11 and the high power density battery 12, (b) the highest and lowest boundary values of the state of charge (SOC) of the high energy density battery 11 and the high power density battery 12, (c) the highest and lowest boundary values of the charge and discharge rate (C-rate) of the high energy density battery 11. In an embodiment of the present embodiment, the boundary condition in the step S202 is:

$$SOH_{high\ energy,min} \leq SOH_{high\ energy} \leq SOH_{high\ energy,max}$$

$$SOH_{high\ power,min} \leq SOH_{high\ power} \leq SOH_{high\ power,max}$$

$$SOC_{high\ energy,min} \leq SOC_{high\ energy} \leq SOC_{high\ energy,max}$$

$$SOC_{high\ power,min} \leq SOC_{high\ power} \leq SOC_{high\ power,max}$$

$$C_{-rate\ high\ energy,min} \leq C_{-rate\ high\ energy,min} \leq C_{-rate\ high\ energy,max}$$

wherein, $SOH_{high\ energy,min}$: represents the lowest boundary value of the state of health of the high energy density battery 11, $SOH_{high\ energy}$: represents the real-time state of health of the high energy density battery 11, $SOH_{high\ energy,max}$: represents the highest boundary value of the state of health of the high energy density battery 11, $SOH_{high\ power,min}$: represents the lowest boundary value of the state of health of the high power density battery 12, $SOH_{high\ power}$: represents the real-time state of health of the high power density battery 12, $SOH_{high\ power,max}$: represents the highest boundary value of the state of health of the high power density battery 12, $SOC_{high\ energy,min}$: represents the lowest boundary value of the state of charge of the high energy density battery 11, $SOC_{high\ energy}$: represents the real-time state of charge of the high energy density battery 11, $SOC_{high\ energy,max}$: represents the highest boundary value of the state of charge of the high energy density battery 11, $SOC_{high\ power,min}$: represents the lowest boundary value of the state of charge of the high power density battery 12, $SOC_{high\ power}$: represents the real-time state of charge of the high power density battery 12, $SOC_{high\ power,max}$: represents the highest boundary value of the state of charge of the high power density battery 12, C_rate high energy,min: represents the lowest boundary value of the charge and discharge rate of the high energy density battery 11, C_rate high energy: represents the real-time charge and discharge rate of the high energy density battery 11, and C_rate high energy,max: represents the highest boundary value of the charge and discharge rate of the high energy density battery 11. Wherein, the computer system must determine that (1) the state of health (SOH) values of the high energy density battery 11 (e.g., ternary lithium battery) and the high power density battery 12 (e.g., lithium-titanate battery) at the working state must be between the highest and lowest boundary values of the state of health (SOH) of the high energy density battery 11 and the high power density battery 12, (2) the state of charge (SOC) values of the high energy density battery 11 (e.g., ternary lithium battery) and the high power density battery 12 (e.g., lithium-titanate battery) at the working state must be between the highest and lowest boundary values of the state of charge (SOC) of the high energy density battery 11 and the high power density battery 12, (3) the charge and discharge rate (C-rate) value of the high energy density battery 11 (e.g., ternary lithium battery) at the working state must be between the highest and lowest boundary values of the charge-discharge rate (C-rate) of the high energy density battery 11. If the working state of the high energy density battery 11 (e.g., ternary lithium battery) or the high power density battery 12 (e.g., lithium-titanate battery) is not within the boundary condition, the battery is not used for electrical output.

Afterwards, in step S203, setting an energy consumption objective function, the energy consumption objective function is:

$$J = F_{(high\ energy\ SOH)} \times F_{(high\ energy\ SOC)} \times$$
$$F_{(high\ energy\ c\_rate)} \times (P_{high\ energy}/\eta_{high\ energy}) +$$
$$F_{(high\ energy\ SOH)} \times F_{(high\ energy\ SOC)} \times (P_{high\ power}/\eta_{high\ power})$$

wherein, J is the energy consumption objective function, F is a weight factor function, P is the battery output power, n is battery discharge efficiency, wherein, $F_{(high\ energy\ SOH)}$: represents the weight factor function of the state of health of the high energy density battery 11, $F_{(high\ energy\ SOC)}$: represents the weight factor function of the state of charge of the high energy density battery 11, $F_{(high\ energy\ c\_rate)}$: represents the weight factor function of the charge and discharge rate of the high energy density battery 11, $P_{high\ energy}$: represents the battery output power of the high energy density battery 11, $\eta_{high\ energy}$: represents the battery discharge efficiency of the high energy density battery 11, $F_{(high\ power\ SOH)}$: represents the weight factor function of the state of health of the high power density battery 12, $F_{(high\ power\ SOC)}$: represents the weight factor function of the state of charge of the high power density battery 12, $P_{high\ power}$: represents the battery output power of the high power density battery 12, and $\eta_{high\ power}$: represents the battery discharge efficiency of the high power density battery 12. In the above description, the energy consumption objective function is established to find the minimum energy consumption in the driving state of the electric vehicle in the system using hybrid batteries.

In step S204, using a global search algorithm to carry out a nested loop search, and calculating and obtaining the minimum equivalent energy consumption value under various driving conditions by the energy consumption objective function to establish a minimum equivalent energy consumption multi-dimensional table, wherein, in an embodiment, the global search algorithm is used for calculations, a nested loop is used to search, discrete parameters, output demand power of various driving states, the SOH value of the ternary lithium battery, the SOH value of the lithium-titanate battery, the SOC value of the ternary lithium battery, the SOC value of the lithium-titanate battery and the output power of the ternary lithium battery are calculated by the objective function to obtain the minimum equivalent energy consumption value under various driving conditions under offline calculation, so as to provide the optimal distribution ratio of battery energy output of electric vehicles.

Finally, in step S205, storing the minimum equivalent energy consumption multi-dimensional table in the computer system, the computer system uses the minimum equivalent energy consumption multi-dimensional table to control the operation of the electric motor, wherein the computer system searches the minimum equivalent energy consumption multi-dimensional table by direct search or interpolated search to obtain the optimal electrical energy output distribution. In an embodiment, the established minimum equivalent energy consumption multi-dimensional table can be used as the basis for the optimal energy management of the electric vehicle with a hybrid battery, so in actual use, the computer system only needs to directly search or interpolate search the minimum equivalent energy consumption multi-dimensional table instantly according to the current state of the battery of the electric vehicle and the desired power or energy. The optimal power distribution ratio with the minimum total energy consumption can be quickly obtained, and then the generated battery output electrical energy is supplied to the electric motor 13. The electric motor 13 outputs energy to the transmission mechanism 14 to make the electric vehicle generate kinetic energy, so as to achieve the purpose of continuous intelligent energy distribution.

Figure 3:
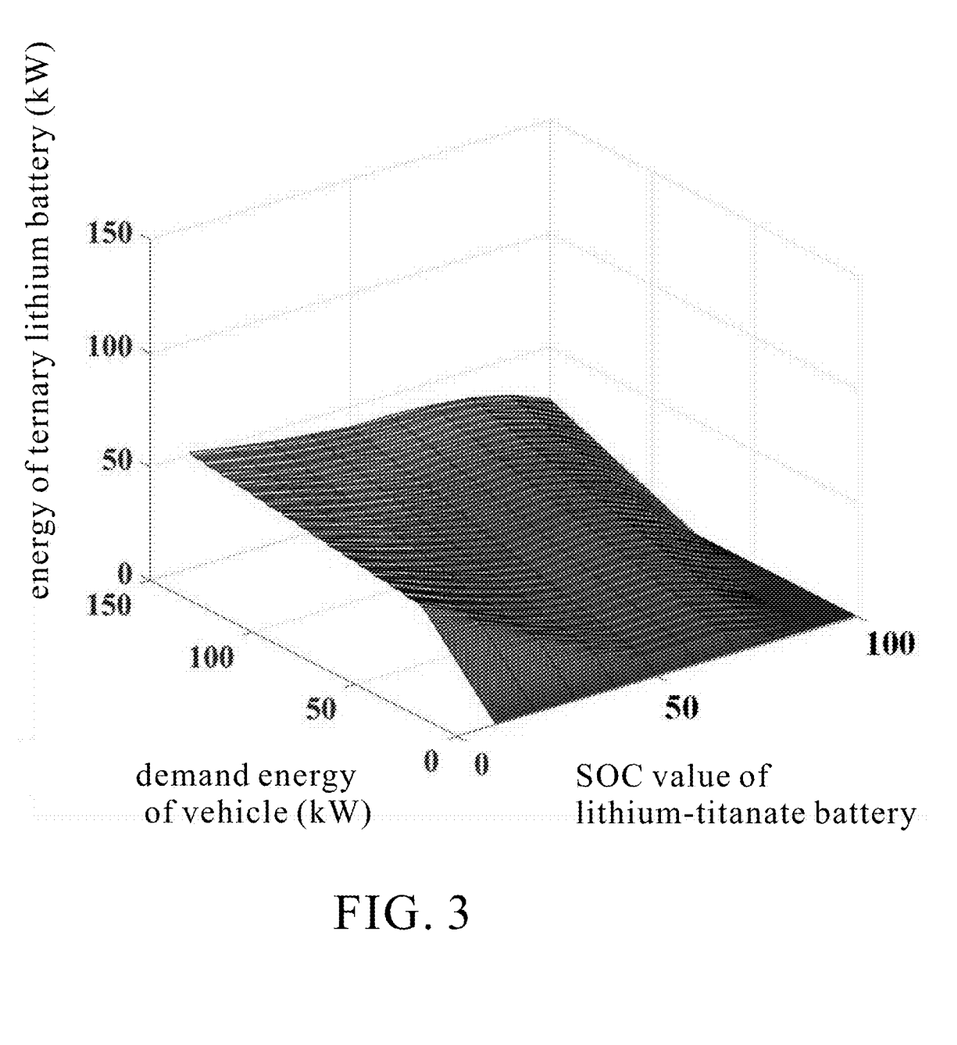
FIG. 3 is an energy distribution diagram of SOC value of a ternary lithium battery of an embodiment of the present disclosure when the SOC value is 90%.
Figure 4:
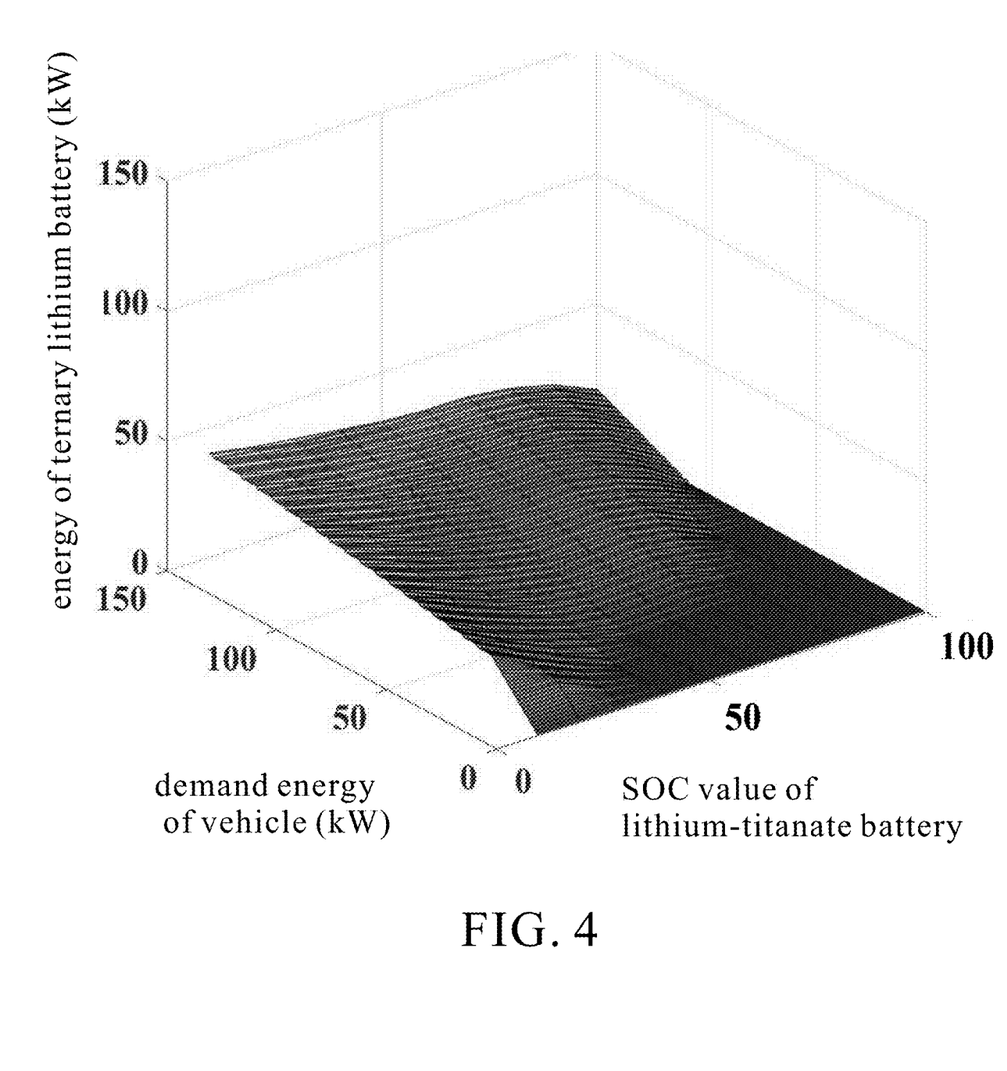
FIG. 4 is an energy distribution diagram of the SOC value of the ternary lithium battery of an embodiment of the present disclosure when the SOC value is 30%.

Refer to FIG. 3, which is an energy distribution diagram of SOC value of a ternary lithium battery of the present disclosure when the SOC value is 90%, and refer to FIG. 4, which is an energy distribution diagram of the SOC value of the ternary lithium battery of the present disclosure when the SOC value is 30%. As shown in FIG. 3, under normal conditions for electric vehicles or electric cars, the SOC values of a lithium-titanate battery and a ternary lithium battery are in normal working intervals, and the two batteries distribute energy output according to battery efficiency to achieve optimal energy consumption. In an embodiment, when the SOC value of a lithium-titanate battery is in a relatively high state (90%), in order to retain the tolerance of brake recovery energy, the ratio of energy distribution of the lithium-titanate battery will increase. In contrast, the output ratio of a ternary lithium battery decreases, and when the SOC value of the lithium-titanate battery is insufficient, the ratio of energy distribution of the ternary lithium battery will increase. When the SOC value of the ternary lithium battery drops to 30%, as shown in FIG. 4, because of the insufficient SOC value of the ternary lithium battery, the overall power supply trend decreases, the discharge ratio of the lithium-titanate battery increases, when the SOC value of the lithium-titanate battery is sufficient and the demand power is low, the ternary lithium battery almost fails to participate in electric power supply to reduce the electric power consumption of the ternary lithium battery, maintain SOC value level, and avoid over-discharge situation. From FIGS. 3 and 4, it is known that the overall energy trend will be adjusted because of the two battery states, so as to protect the battery working in the normal interval to maintain optimal energy consumption, and avoid the aggravation of aging caused by improper use of the battery such as battery over-discharge and C-rate exceeding the load range.

Many countries actively promote vehicle electrification by national policies, the research and development and application for all kinds of electric cars have become the future trend, but because of the limitation of battery characteristics, a single type of battery cannot be effectively used to respond to various road conditions in driving, and to achieve the needs of long battery life and low cost, and thus the use of hybrid electric power configuration and the use of control technology can make electric cars drive to achieve the optimal cost of battery use.

While the present invention has been described by means of specific embodiments, numerous modifications and variations could be made thereto by those skilled in the art without departing from the scope and spirit of the present invention set forth in the claims.

What is claimed is:

1. A method of hybrid battery electrical energy output distribution control for an electric vehicle, performed by a computer system that controls operation of an electric motor of the electric vehicle, the method comprising:
    (A) providing battery data of an energy density battery and a power density battery to the computer system, wherein the energy density battery has a higher energy density than the power density battery and the power density battery has a higher power density than the energy density battery;
    (B) setting a boundary condition of the energy density battery and the power density battery on the computer system, the boundary condition comprising (a) highest and lowest boundary values of state of health (SOH) of the energy density battery and the power density battery, (b) highest and lowest boundary values of state of charge (SOC) of the energy density battery and the power density battery, (c) highest and lowest boundary values of charge and discharge rate (C-rate) of the energy density battery;
    (C) setting an energy consumption objective function on the computer system, the energy consumption objective function is:

$$J = F_{(energy\ SOH)} \times F_{(energy\ SOC)} \times F_{(energy\ C\text{-}rate)} \times (P_{energy}/\eta_{energy}) + F_{(power\ SOH)} \times F_{(power\ SOC)} \times (P_{power}/\eta_{power})$$

wherein, J represents the energy consumption objective function, F represents a weight factor function, P represents battery output power, $\eta$ represents battery discharge efficiency, and the energy and power subscripts refer to the energy density and power density batteries, respectively;
    (D) using a global search algorithm to carry out a nested loop search on the computer system, and calculating and obtaining a minimum equivalent energy consumption value under various driving conditions by the energy consumption objective function to establish a minimum equivalent energy consumption multi-dimensional table; and
    (E) storing the minimum equivalent energy consumption multi-dimensional table in the computer system, and controlling, by the computer system using the minimum equivalent energy consumption multi-dimensional table, operation of the electric motor to operate a transmission mechanism of the electric vehicle,
    wherein the minimum equivalent energy consumption multi-dimensional table is used as the basis for the computer system to search the minimum equivalent energy consumption multi-dimensional table according to a current state of the energy density battery and the power density battery of the electric vehicle and a desired power or energy,
    then an optimal power distribution ratio with the minimum total energy consumption is obtained from the minimum equivalent energy consumption multi-dimensional table,
    wherein the energy density battery is a ternary lithium battery, the ternary lithium battery is electrically connected to the electric motor, and
    wherein the power density battery is a lithium-titanate battery, the lithium-titanate battery is electrically connected to the electric motor.

2. The method of hybrid battery electrical energy output distribution control for an electric vehicle according to claim 1, wherein state of health (SOH) values of the energy density battery at a working state are between the highest and lowest boundary values of the state of health (SOH) of the energy density battery and state of health (SOH) values of the power density battery at the working state are between the highest and lowest boundary values of the state of health (SOH) of the power density battery.

3. The method of hybrid battery electrical energy output distribution control for an electric vehicle according to claim 1, wherein the state of charge (SOC) values of the energy density battery at a working state are between the highest and lowest boundary values of the state of charge (SOC) of the energy density battery and the state of charge (SOC) values of the power density battery at the working state are between the highest and lowest boundary values of the state of charge (SOC) of the power density battery.

4. The method of hybrid battery electrical energy output distribution control for an electric vehicle according to claim 1, wherein the charge and discharge rate (C-rate) value of the energy density battery at a working state is between the highest and lowest boundary values of the charge and discharge rate (C-rate) of the energy density battery.

5. The method of hybrid battery electrical energy output distribution control for an electric vehicle according to claim 1, wherein searching the minimum equivalent energy consumption multi-dimensional table on the computer system is performed by direct search or interpolated search to obtain the optimal electrical energy output distribution.

* * * * *